United States Patent
Wang et al.

(10) Patent No.: US 10,236,761 B2
(45) Date of Patent: Mar. 19, 2019

(54) VIBRATING MOTOR

(71) Applicants: Hongxing Wang, Shenzhen (CN); Lubin Mao, Shenzhen (CN); Fei Hou, Shenzhen (CN)

(72) Inventors: Hongxing Wang, Shenzhen (CN); Lubin Mao, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 521 days.

(21) Appl. No.: 15/062,101

(22) Filed: Mar. 5, 2016

(65) Prior Publication Data
US 2017/0033653 A1   Feb. 2, 2017

(30) Foreign Application Priority Data
Jul. 31, 2015   (CN) .......................... 2015 2 0570202

(51) Int. Cl.
| H02K 33/16 | (2006.01) |
| H02K 33/02 | (2006.01) |
| H02K 35/00 | (2006.01) |
| H02K 35/02 | (2006.01) |
| H02K 7/18 | (2006.01) |

(52) U.S. Cl.
CPC ............ *H02K 33/16* (2013.01); *H02K 7/1869* (2013.01); *H02K 7/1892* (2013.01); *H02K 33/02* (2013.01); *H02K 35/00* (2013.01); *H02K 35/02* (2013.01)

(58) Field of Classification Search
CPC ........ H02K 33/00; H02K 33/02; H02K 33/16; H02K 35/00; H02K 35/02; H02K 35/04; H02K 35/06; H02K 41/02; H02K 7/1869; H02K 7/1876; H02K 7/1892; B06B 1/00; B06B 1/02; B06B 1/0215; B06B 1/0223; B06B 1/0269; B06B 1/0614; B06B 1/04; B06B 1/045
USPC ....... 310/25, 15, 81, 80, 321, 20, 21, 28–30, 310/36–37, 40 MM, 12.01–12.27; 381/400–422; 359/824
See application file for complete search history.

(56) References Cited

U.S. PATENT DOCUMENTS

| 7,671,493 B2 * | 3/2010 | Takashima | .............. B06B 1/045 310/12.16 |
| 7,999,421 B2 * | 8/2011 | Kim | ....................... H02K 33/18 310/15 |
| 8,269,379 B2 * | 9/2012 | Dong | ..................... H02K 33/16 310/25 |

(Continued)

*Primary Examiner* — Bernard Rojas
*Assistant Examiner* — Maged M Almawri
(74) *Attorney, Agent, or Firm* — Na Xu; IPro, PLLC

(57) ABSTRACT

A vibrating motor is provided in the present disclosure. The vibrating motor includes a shell, a base covered by the shell for forming an accommodating space, a vibrating system accommodated in the accommodating space, and a pair of elastic connectors connected to two opposite ends of the vibrating system respectively for elastically suspending the vibrating system in the accommodating space. Each elastic connector includes a first elastic member and a second elastic member for connecting a corresponding end of the vibrating system to the shell; the first elastic member includes a first elastic arm, and the second elastic member includes a second elastic arm crossing over and interesting with the first elastic arm.

12 Claims, 3 Drawing Sheets

(56) References Cited

U.S. PATENT DOCUMENTS

| | | | | |
|---|---|---|---|---|
| 8,829,741 B2* | 9/2014 | Park | ......................... | B06B 1/045 |
| | | | | 310/25 |
| 8,878,401 B2* | 11/2014 | Lee | ......................... | H02K 33/16 |
| | | | | 310/15 |
| 9,225,265 B2* | 12/2015 | Oh | ......................... | B06B 1/0644 |
| 10,033,257 B2* | 7/2018 | Zhang | ................... | H02K 33/12 |
| 2006/0066164 A1* | 3/2006 | Kim | ........................ | H02K 7/061 |
| | | | | 310/81 |
| 2010/0302752 A1* | 12/2010 | An | ......................... | H02K 33/06 |
| | | | | 361/807 |
| 2011/0156500 A1* | 6/2011 | Dong | .................... | H02K 33/16 |
| | | | | 310/25 |
| 2011/0266892 A1* | 11/2011 | Wauke | .................... | B06B 1/045 |
| | | | | 310/25 |
| 2012/0169148 A1* | 7/2012 | Kim | ........................ | H02K 33/16 |
| | | | | 310/25 |
| 2015/0137627 A1* | 5/2015 | Katada | ................... | H02K 33/16 |
| | | | | 310/25 |
| 2015/0194870 A1* | 7/2015 | Kim | ........................ | H02K 33/18 |
| | | | | 310/25 |
| 2017/0214306 A1* | 7/2017 | Katada | ................... | B06B 1/045 |

\* cited by examiner

VIBRATING MOTOR

FIELD OF THE DISCLOSURE

The present disclosure generally relates to vibrator technologies, and more particularly, to a vibrating motor applicable to an electronic device for providing vibration feedback.

BACKGROUND

With development of electronic technologies, electronic devices, such as mobile phones, handheld game players, tablet computers, portable multimedia players, or the like, become more and more popular. A typical electronic device includes a vibrating motor for providing vibration feedback. For example, a vibrating motor may be used in a mobile phone for providing vibration prompting while receiving an incoming call or a message such as a short message, a multimedia message, an instant message, or a push message.

A related vibrating motor includes two vibrating systems located in a shell and opposite to each other, and the two vibrating systems are suspended by two elastic connectors respectively. The two elastic connectors are parallel to and separated from each other, and due to a limited space in the shell, the elastic connectors is required to have a small size. Thus may lower a reliability of the vibrating motor.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
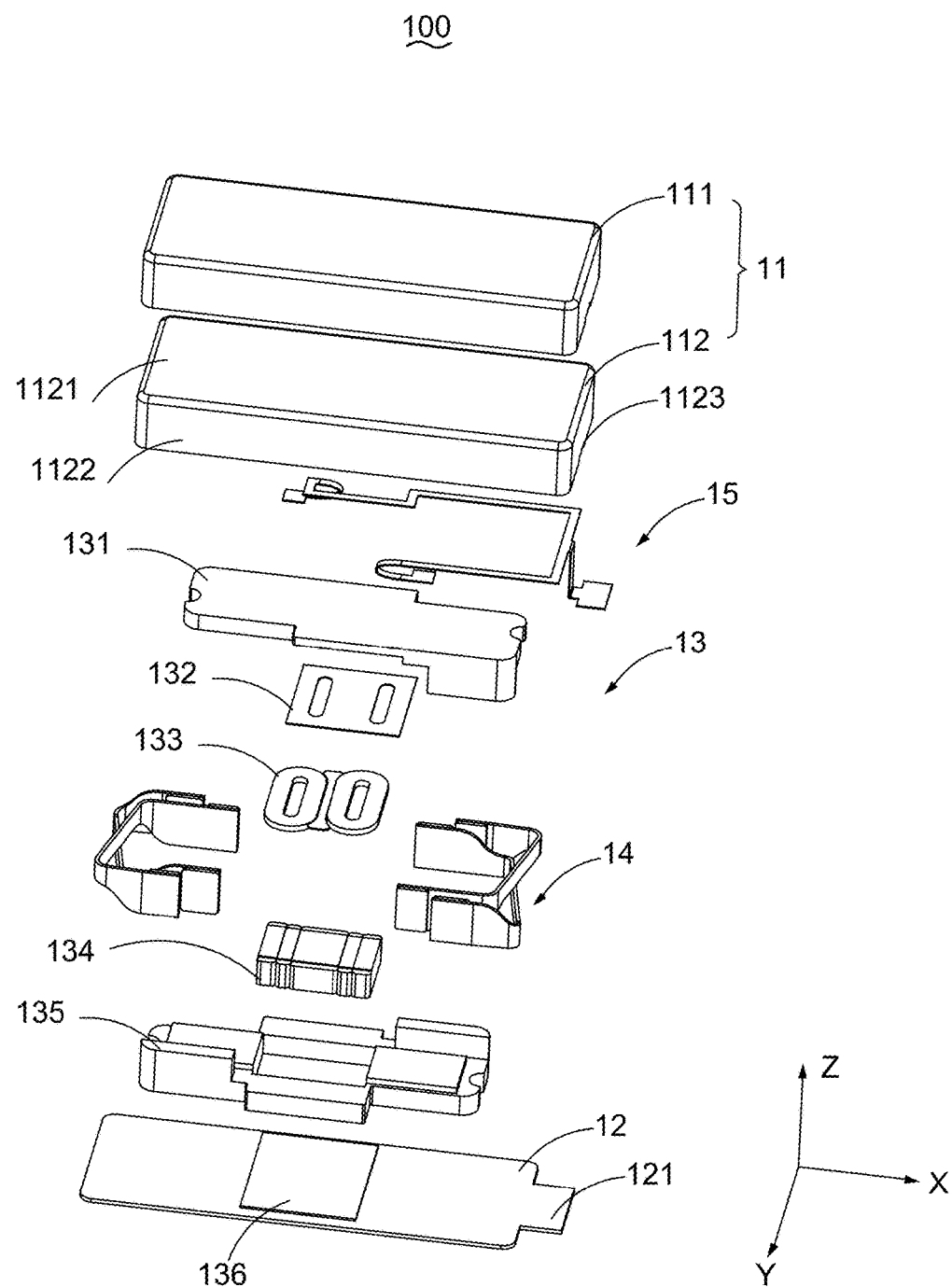
FIG. 1 is an exploded view of a vibrating motor according to an exemplary embodiment of the present disclosure.

Referring to FIG. 1, a vibrating motor 100 according to an exemplary embodiment of the present disclosure is shown. The vibrating motor 100 includes a shell 11, a base 12, a vibrating system 13, a pair of elastic connectors 14 and a flexible circuit board 15.

The shell 11 includes a first cover 112 and a second cover 111, both of which have a box-like structure with an opening facing the base. The first cover 112 and the second cover 111 may serve as an inner cover and an outer cover of the shell 11, and the second cover 111 has a size greater than that of the first cover 112. The first cover 112 may cover the base 12 by welding or adhering to form an accommodating space, and the second cover 111 further covers the first cover 112. The first cover 112 includes a rectangular top plate 1121, a pair of first sidewalls 1122 and a pair of second sidewalls 1123 extending perpendicularly from the top plate 1121 towards the base 12. In particular, the first sidewalls 1122 extend perpendicularly from two opposite long edges of the top plate 1121, and the second sidewalls 1123 extend perpendicularly from two opposite short edges of the top plate 1121.

The base 12 may be a flat plate, which includes a supporting platform 121 extending from an end of the base 11, the supporting platform 121 is coplanar with a main surface of the base 11, and is not covered by the shell 11. The supporting platform 121 is configured for supporting and fixing to a fixing part of the flexible circuit board 15.

The vibrating system 13 is accommodated in the accommodating space, and is elastically suspended by the pair of elastic connectors 14. For example, the pair of elastic connectors 14 may connecting two opposite ends of the vibrating system 13 with the shell 11. The flexible circuit board 15 is also accommodated in the accommodating space except for the fixing part thereof. The flexible circuit board 15 is configured for receiving and transmitting an electric signal to the vibrating system 13, and the vibrating system 13 is driven to perform linear vibration in a vibration direction parallel to an X-axis direction as illustrated in FIG. 1.

In the present embodiment, the vibrating system 13 includes a first vibrating unit and a second vibrating unit. The first vibrating unit and the second vibrating unit are opposite to and apart from each other, for example, the first vibrating unit and the second vibrating unit arranged in parallel along a Z-axis direction perpendicular to the vibration direction.

Figure 3:
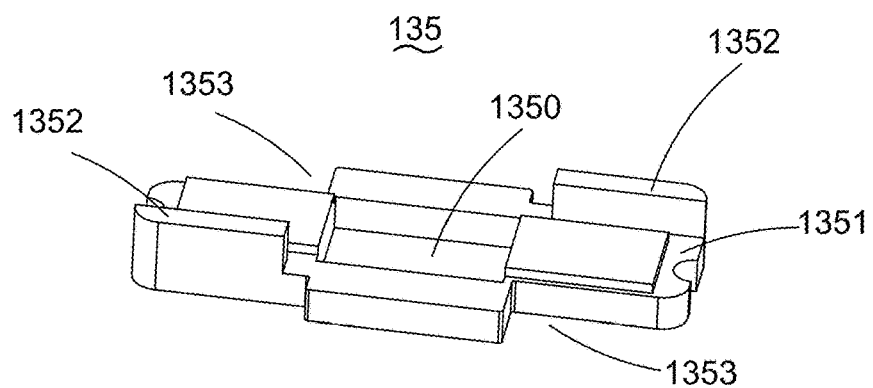
FIG. 3 is a schematic view of a first mass member of the vibrating motor of FIG. 1.

The first vibrating unit is adjacent to the base 12, includes a magnet module 134, a first mass member 135 and a first pole plate 136. As illustrated in FIG. 3, the first mass member 135 includes a first main body 1351 having a substantially rectangular shape with two opposite long edges and two opposite short edges, the first main body 1351 includes a through hole 1350 formed at a main central region thereof for receiving the magnet module 134. The first mass member 135 further includes a pair of first protrusions 1352 protruding perpendicularly towards the second vibrating unit from the two opposite long edges of the first main body 1351 respectively. The pair of first protrusions 1352 are located at two opposite sides of the through hole 1350, and may be central symmetrical about the through hole 1350.

Moreover, the first main body 1351 may further include a pair of first recesses 1353 respectively formed at the two long edges thereof; the pair of first recesses 1353 may also be central symmetrical about the through hole 1350, and each of the first recesses 1353 is opposite to a respective one of the first protrusions 1352.

The magnet module 134 is received in the through hole 1350 of the first mass member 135, and the first pole plate 136 is placed on the base 11 and is attached onto the magnet module 134 and covers the through hole 1350. In particular, the magnet module 134 may include a plurality of permanent magnets arranged in parallel.

Figure 2:
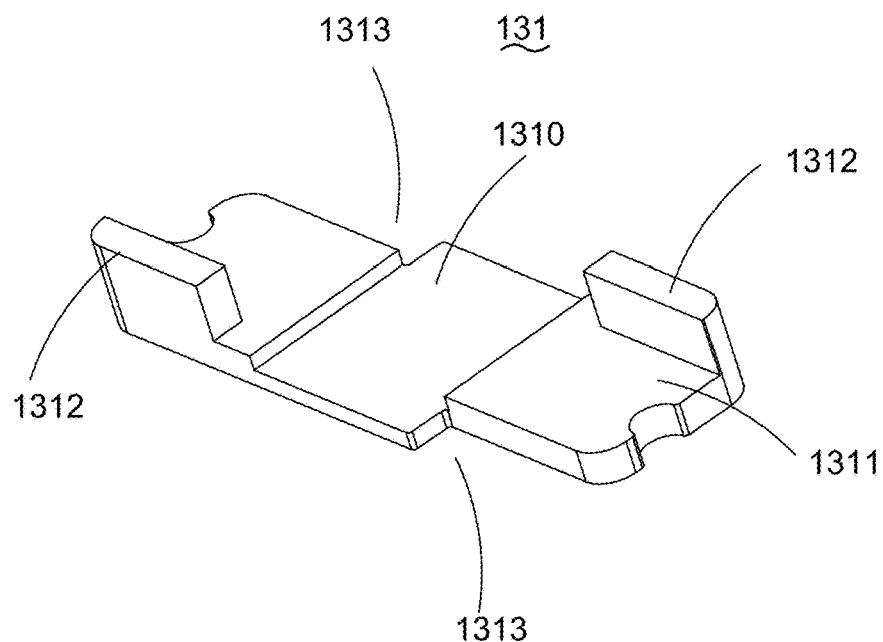
FIG. 2 is a schematic view of a second mass member of the vibrating motor of FIG. 1.

The second vibrating unit includes a second mass member 131, a second pole plate 132 and a coil assembly 133. As illustrated in FIG. 2, the second mass member 131 includes a second main body 1311 having a substantially rectangular shape with two opposite long edges and two opposite short edges, the second main body 1311 includes a receiving groove 1310 formed at a main central region thereof and facing the through hole 1350 of the first mass member 135. The second mass member 131 further includes a pair of second protrusions 1312 protruding perpendicularly towards the first vibrating unit from the two opposite long edges of the second main body 1311 respectively. The pair of second protrusions 1312 is located at two opposite sides of the receiving groove 1310 and corresponds to the pair of first recesses 1353 respectively, so that the second protrusions 1312 can be respectively received and fixed in the first recesses 1353 in assembly.

Moreover, the second main body 1311 may further include a pair of second recesses 1313 respectively formed at the two long edges thereof; each of the second recesses 1313 is opposite to a respective one of the second protrusions 1312. The pair of second recesses 1313 corresponds to the pair of first protrusions 1352 respectively, so that the first protrusions 1352 can be respectively received and fixed in the second recesses 1313 in assembly.

The second coil plate 132 is attached on the coil assembly 133, and both the second coil plate 132 and the coil assembly 133 are received in the receiving groove 1310 of the second mass member 131. The coil assembly 133 may include a pair of coils arranged in parallel, both of which are located to face the magnet module 134.

Alternatively, the pair of first protrusions 1352 may be formed at a same end of the first mass member 135, and the pair of first recesses 1353 is formed at an opposite end of the first mass member 135; in this circumstance, the pair of second protrusions 1312 are both formed at a same end of the second mass member 131 corresponding to the pair of first recesses 1353, and the pair of second protrusions 1313 are formed at an opposite end of the second mass member 131 corresponding to the pair of first protrusions 1352.

The flexible circuit board 15 may have a frame-like structure with a profile matching the second mass member 131. The flexible circuit board 15 includes a main body placed on the second mass member 131, a fixing part extending perpendicularly from an edge of the main body to the base 12 and being fixed to the supporting platform 121 of the base 12, and two connecting ends extending towards the coil assembly 133 in a U-shaped manner. The two connecting ends are further connected to the coil assembly 133 for transmitting electric signals to the coil assembly 133.

Figure 4:
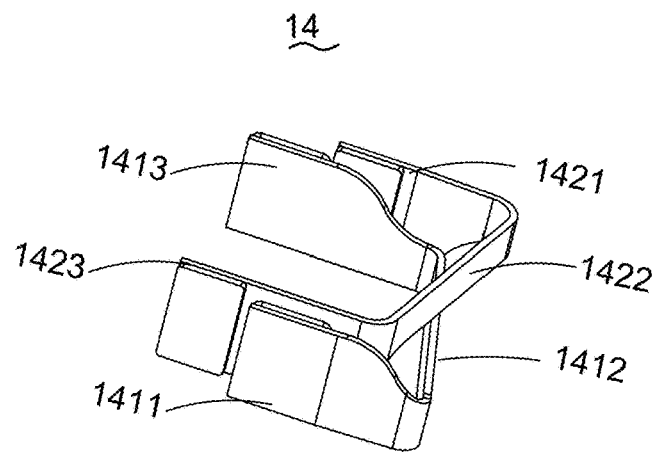
FIG. 4 is a schematic view of an elastic connector of the vibrating motor of FIG. 1.
Figure 5:
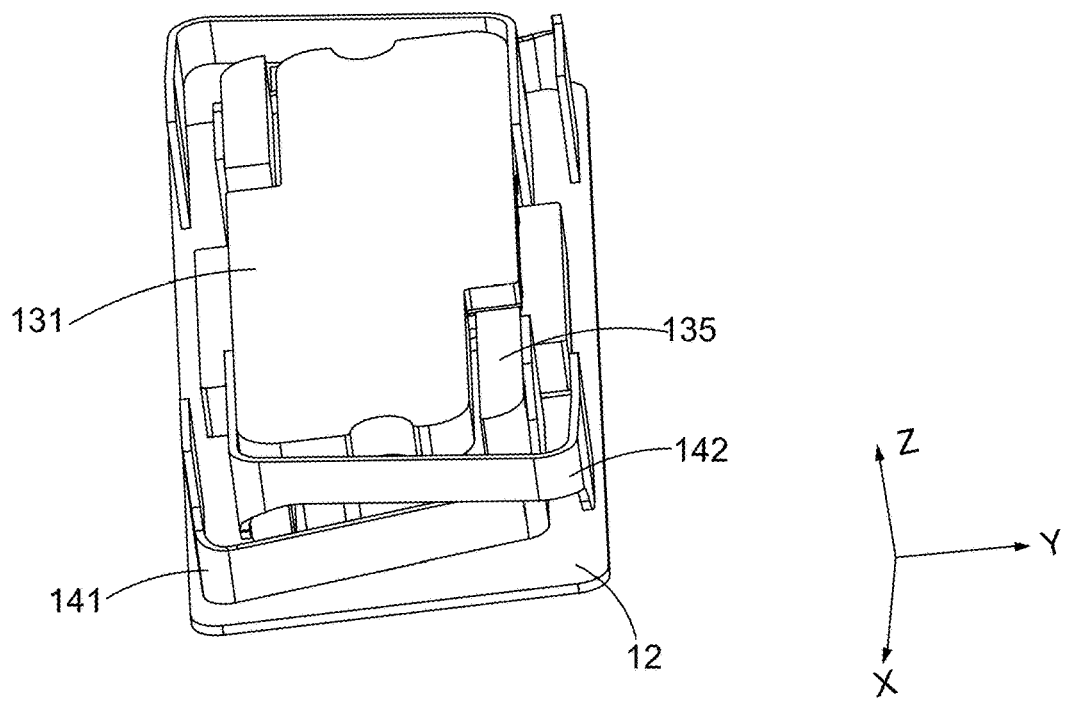
FIG. 5 is a partly assembled view of the vibrating motor of FIG. 1.

Referring also to FIGS. 4-5, in assembly, the pair of elastic connectors 14 is configured for elastic suspending the vibrating system 13 in the accommodating space, each of the elastic connectors 14 may be connected between an end of the vibrating system 13 and the first sidewalls 1122 of the first cover 112.

Specifically, each of the elastic connectors 14 includes a first elastic member 141 and a second elastic member 142 partly intersecting with each other, both the first elastic member 141 and the second elastic member 142 have a substantially U-shaped configuration.

The first elastic member 141 includes a first connecting part 1413 connected to the first mass member 135, a first fixing part 1411 fixed to the first cover 112, and a first elastic arm 1412 connected between the first fixing part 1411 and the first connecting part 1413. The first fixing part 1411 and the first connecting part 1413 respectively extend from two opposite ends of the first elastic arm 1411 to form the U-shaped configuration to partly surround a corresponding end of the vibrating system 13. In particular, the first connecting part 1413 may be connected to an outer surface of a first protrusion 1352 of the first mass member 135; the first fixing part 1413 is fixed to an inner surface of a corresponding first sidewall 1122 of the first cover 112.

In the present embodiment, a projection height of the first connecting part 1413 on the first sidewall 1122 along a Y-axis direction is greater than that of the first mass member 135, e.g., not less than that of the first protrusion 1352; a projection height of the first elastic arm 1412 on the first sidewall 1122 along the Y-axis direction is less than that of the first connecting part 1413. Furthermore, a projection height of the first fixing part 1411 on the first sidewall 1122 along the Y-axis direction is greater than or equal to that of the first connecting part 1413. In the present disclosure, the projection height refers to a length extending along a Z-axis direction, the Y-axis direction is perpendicular to the vibration direction of the vibrating system (i.e., the X-axis direction) and is coplanar with a vibrating plane of the vibrating system; the Z-axis direction is vertical to the vibrating plane of the vibrating system.

The second elastic member 142 has a configuration similar to that of the first elastic member 141, for example, the second elastic member 142 includes a second connecting part 1423 connected to the second mass member 131, a second fixing part 1421 fixed to the first cover 112, and a second elastic arm 1422 connected between the second fixing part 1421 and the second connecting part 1423. The second fixing part 1421 and the second connecting part 1423 respectively extend from two opposite ends of the second elastic arm 1421 to form the U-shaped configuration to partly surround a same end of the vibrating system 13 as the first elastic member 141. In particular, the second connecting part 1423 may be connected to an outer surface of a second protrusion 1312 of the second mass member 131; the second fixing part 1423 is fixed to an inner surface of a corresponding first sidewall 1122 of the first cover 112, and it should be noted that the fixing part 1423 and the first fixing part 1413 are respectively fixed to two opposite first sidewalls 1122 of the first cover 112.

In the present embodiment, a projection height of the second connecting part 1423 on the first sidewall 1122 along the Y-axis direction is greater than that of the second mass member 131, e.g., not less than that of the second protrusion 1312; a projection height of the second elastic arm 1422 on the first sidewall 1122 along the Y-axis direction is less than that of the second connecting part 1423. Furthermore, a projection height of the second fixing part 1421 on the first sidewall 1122 along the Y-axis direction is greater than or equal to that of the second connecting part 1423.

In the elastic connector 14, the second elastic arm 1422 of the second elastic member 142 crosses over the first elastic arm 1412 of the first elastic member 141. A projection of the first connecting part 1413 on the base 12 along the Z-axis direction is parallel to and apart from that of the second fixing part 1421, and a projection of the second connecting part 1423 on the base 12 along the Z-axis direction is parallel to and apart from that of the first fixing part 1411. In addition, a projection of the first elastic arm 1412 on the base 12 along the Z-axis direction intersects with that of the second elastic arm 1422; the first elastic arm 1412 and the second elastic arm 1422 incline to the base 12 in different inclined directions.

In vibrating motor 100 as provided in the present disclosure, each of the elastic connectors 14 for suspending the vibrating system 13 includes the first connecting member 141 and the second connecting member 142 with the above-described configuration and intersecting with each other, therefore, a connecting range between the elastic connector 14 and the vibrating system 13 can be increased, this can depress undesired stress to the elastic connector 14. Accordingly, a reliability of the vibrating motor 100 can be improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibrating motor, comprising:
a shell;
a base covered by the shell for forming an accommodating space;
a vibrating system accommodated in the accommodating space; and
a pair of elastic connectors connected to two opposite ends of the vibrating system respectively for elastically suspending the vibrating system in the accommodating space;
wherein the vibrating system comprises a first vibrating unit and a second vibrating unit arranged in parallel, the first vibrating unit comprises a first mass member and a magnet module received in the first mass member, the second vibrating unit comprises a second mass member and a coil assembly received in the second mass member; each elastic connector comprises a first elastic member and a second elastic member for connecting a corresponding end of the vibrating system to the shell, both the first elastic member and the second elastic member have a U-shaped configuration; the first elastic member comprises a first elastic arm, a first connecting part connected to the first mass member and a first fixing part fixed to the shell, the first fixing part and the first connecting part respectively extend from two opposite ends of the first elastic arm to form the U-shaped configuration for partly surrounding an end of the vibrating system; the second elastic member comprises a second elastic arm crossing over and intersecting with the first elastic arm, a second connecting part connected to the second mass member and a second fixing part fixed to the shell, the second fixing part and the second connecting part respectively extend from two opposite ends of the second elastic arm to form the U-shaped configuration for partly surrounding the end of the vibrating system.

2. The vibrating motor as described in claim 1, wherein the shell comprises a cover with a top plate, a pair of first sidewalls extending from two opposite long edges of the top plate, and a pair of second sidewalls extending from two opposite short edges of the top plate.

3. The vibrating motor as described in claim 2, wherein the first fixing part is fixed to an inner surface of a first sidewall of the cover, and the second fixing part is fixed to an inner surface of an opposite first sidewall of the cover.

4. The vibrating motor as described in claim 3, wherein a projection height of the first connecting part on the first sidewall is greater than that of the first mass member; a projection height of the second connecting part on the first sidewall is greater than that of the second mass member.

5. The vibrating motor as described in claim 4, wherein a projection height of the first elastic arm on the first sidewall is less than that of the first connecting part, and a projection height of the first fixing part on the first sidewall is greater than or equal to that of the first connecting part.

6. The vibrating motor as described in claim 5, wherein a projection height of the second elastic arm on the first sidewall is less than that of the second connecting part, and a projection height of the second fixing part on the first sidewall is greater than or equal to that of the second connecting part.

7. The vibrating motor as described in claim 1, wherein the first mass member comprises a first main body with two opposite long edges and two opposite short edges, the first main body includes a through hole formed at a main central region thereof for receiving the magnet module.

8. The vibrating motor as described in claim 7, wherein the first mass member further comprises a pair of first protrusions protruding perpendicularly towards the second vibrating unit from the two opposite long edges of the first main body respectively, the pair of first protrusions are located at two opposite sides of the through hole, and the first connecting part is connected to an outer surface of the first protrusion.

9. The vibrating motor as described in claim 8, wherein the first main body further comprises a pair of first recesses respectively formed at the two long edges thereof; each of the first recesses is opposite to a respective one of the first protrusions.

10. The vibrating motor as described in claim 9, wherein the second mass member comprises a second main body with two opposite long edges and two opposite short edges, the second main body comprises a receiving groove facing the through hole of the first mass member for receiving the coil assembly.

11. The vibrating motor as described in claim 10, wherein the second mass member further comprises a pair of second protrusions protruding perpendicularly towards the first vibrating unit from the two opposite long edges of the second main body respectively, the pair of second protrusions is located at two opposite sides of the receiving groove and are respectively received in the first recesses of the first mass member, and the second connecting part is connected to an outer surface of the second protrusion.

12. The vibrating motor as described in claim 11, wherein the second main body further comprises a pair of second recesses respectively formed at the two long edges thereof, each of the second recesses is opposite to a respective one of the second protrusions; the pair of first protrusions of the first mass member is respectively received in the pair of second recesses of the second mass member.

* * * * *